United States Patent Office 3,512,432
Patented May 19, 1970

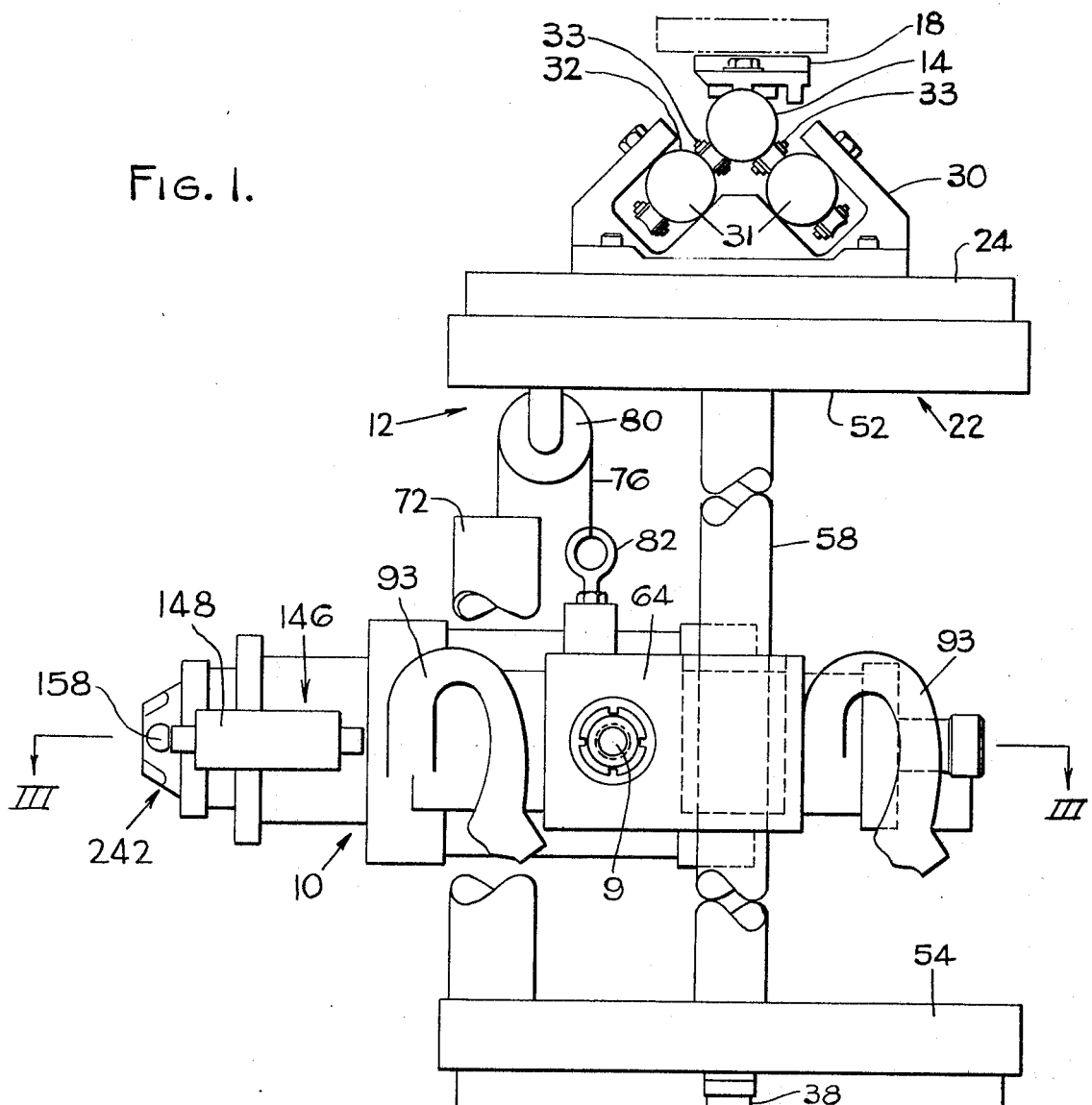
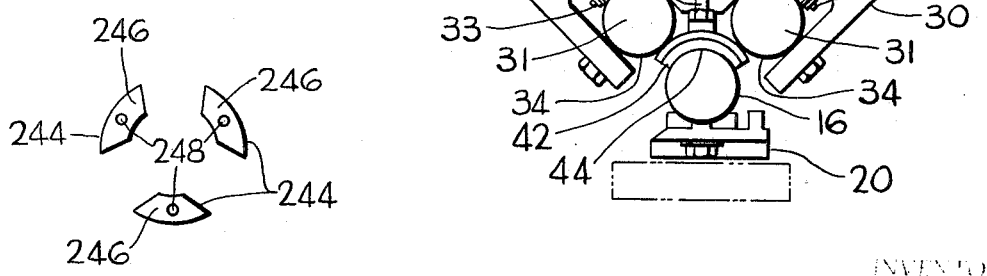

3,512,432
LOCATING AND ORIENTING MEANS FOR DRILLS
Thomas H. Speller, Buffalo, N.Y., assignor to General-Electro Mechanical Corporation, Buffalo, N.Y.
Filed July 19, 1968, Ser. No. 746,056
Int. Cl. B23b 39/04
U.S. Cl. 77—5
19 Claims

ABSTRACT OF THE DISCLOSURE

A supporting, locating, and orienting apparatus for a drill assembly having a carriage movable on a frame in one direction and a pair of slides slidably mounted on said carriage for movement in a direction normal to said one direction. A drill assembly is pivotally mounted on the slides about a pivot axis perpendicular to the longitudinal axis of the drill assembly. The carriage is pivotally mounted with respect to the frame on a pivot axis which defines a second pivot axis for the drill assembly at right angles to the first pivot axis. A spherical locating foot is spaced laterally from the drill axis and engages an opening in a template carried by the work to locate the drill axis. The drill assembly is provided with pressure feet which are moved into engagement with a work surface after the drill axis is located to produce pivotal movement of the drill assembly about its pivot axes until the longitudinal axis of the drill assembly is oriented normal to the work surface to be drilled.

BACKGROUND OF THE INVENTION

This invention relates generally to a drill supporting, locating and orienting apparatus and, more particularly, to support means for orienting a drill assembly normal to the point of drill contact on the curved surface of a contoured workpiece.

In the art of drilling a series of holes in structures such as metal panels, it has been known to employ a template strip having a large number of guide holes for controlling the spacing and positioning of the holes to be drilled. Very often the drilling assembly is provided with a laterally spaced expandable collet which is inserted through a guide hole in the template strip and into the hole previously formed in the work surface to provide a reference from which the next hole may be formed in the surface.

Other various techniques have been employed to obtain desired spacing between the holes to be formed. Although these prior known devices and techniques have served the purposes for which they were designed, they have not been entirely satisfactory under all conditions of operation. One of the critical problems confronted in the utilization of these prior known devices is their inability to accurately drill holes perpendicularly or at right angles to a contoured work surface, such as an aircraft wing panel for example, which may be curved in either one or in both directions.

SUMMARY OF THE INVENTION

The apparatus of the present invention, as hereinafter described, provides a solution to the above problem by providing a support means for a drill assembly which insures proper orientation of the drill assembly relative to a work surface of any curvature for drilling holes perpendicularly to such work surface.

Generally speaking, the drill assembly of the present invention is mounted on a carriage movable on a pair of guide rods in a horizontal direction substantially parallel to the plane of the surface of the workpiece, such as a wing panel vertically mounted on a supporting frame. The carriage is provided with rotatable bearing means for enabling rotation of said carriage and therefore the drill assembly about a pivot axis. The carriage is further provided with a pair of slides which support the drill assembly and are movable together in a vertical direction or a direction normal to the path of movement of the carriage.

The drill assembly is pivotally mounted on the slides about an axis lying in a transverse plane normal to the longitudinal axis of the drill assembly and at right angles to the axis of the aforementioned carriage bearing means. Thus, the drill assembly is pivotable about two transverse axes, one axis resulting from the pivotal mounting of the drill assembly on the slides and the other axis resulting from the rotary motion of the carriage about its pivot axis. A laterally spaced template-engaging pin is mounted near the bottom of the drill assembly and has a spherical head engageable with a hole in a template mounted on the work surface. The drill assembly is also provided with a drill and pressure foot means having three feet engageable with the work surface and equally spaced about the axis of the drill.

In positioning the drill assembly, after the locating pin has engaged a given template hole, the pressure feet move toward the work surface until all three feet are securely bearing against the work surface. This produces pivotal movement of the drill assembly about the two pivot axes mentioned above until the longitudinal axis of the drill assembly is disposed at right angles to the work surface immediately adjacent to the hole to be drilled, thus enabling the hole to be drilled accurately at a right angle to the work surface.

BRIEF DESCRIPTION OF THE DRAWINGS

FIG. 1 is a side elevational view of one form of drill supporting and locating apparatus constructed in accordance with the principles of the present invention;

FIG. 5 is a bottom end view of a pressure foot assembly of the apparatus.

DESCRIPTION OF THE PREFERRED EMBODIMENT

Figure 2:
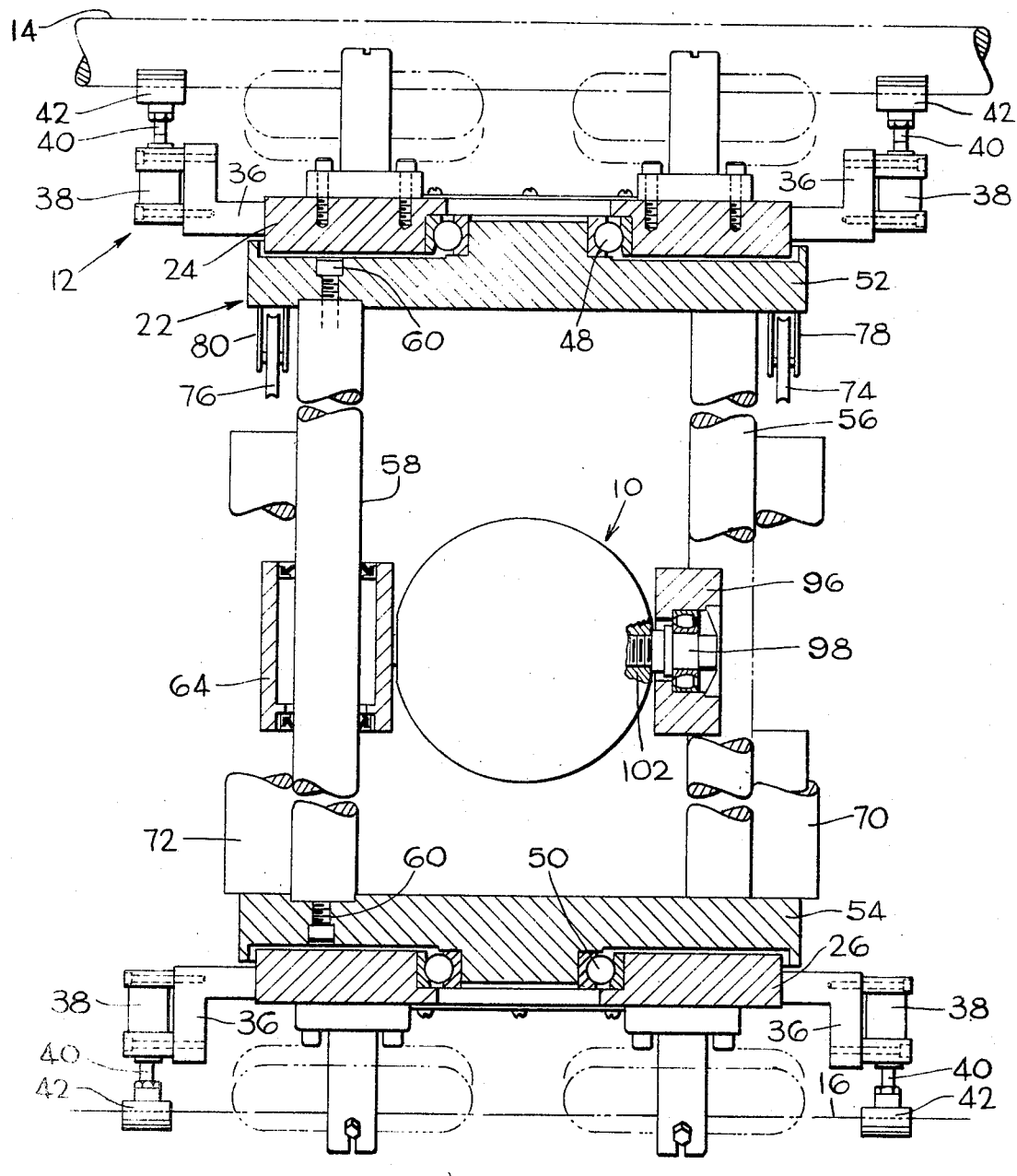
FIG. 2 is a rear elevational view, partially in cross-section, of the support apparatus shown in FIG. 1.

Referring now to the drawings, and particularly to FIGS. 1 and 2, it will be seen that a semi-portable drill supporting and locating apparatus, constructed in accordance with the principles of this invention, comprises an elongated, portable ram drill assembly, generally designated 10, mounted on a carriage frame structure, comprehensively designated 12, for various angular and pivotal movements which will hereinafter become apparent.

The carriage frame structure 12 comprises upper and lower horizontally extending parallel guide rods 14 and 16 which extend generally parallel to the surface of a clamped workpiece, such as a wing panel by way of example, which is held in a generally vertical plane. The rods 14 and 16 may be suitably mounted on the ceiling or floor of a fabricating room or on structural beams extending downwardly or upwardly therefrom by means of way mounts 18 and 20, respectively. The terms upper, lower, bottom, top, upwardly, downwardly, and the like, as used hereinafter, are applied only for convenience of description with reference to FIGS. 1 and 2 of the drawings and should not be taken as limiting the scope of the invention.

A carriage, comprehensively designated 22, is adapted to ride along rods 14 and 16 and comprises a pair of vertically spaced mounting plates 24 and 26, each having a U-shaped mounting block 30 for carrying dual round-way bearings 32 and 34 for rolling contact with the rods 14 and 16 to facilitate relative longitudinal movement therebetween. Each of the roundway bearings is conventional and comprises an elongated track 31 and an endless chain having a plurality of rollers 33 mounted thereon movable in an orbital path about the longitudinal periphery of the track 31 and held in bearing contact with the track within the housing.

As shown in FIG. 2, mounting plates 24 and 26 have brackets 36 extending laterally from opposite sides thereof, respectively, with fluid actuated cylinders 38 mounted thereon. Each of the cylinders 38 is provided with a suitable piston connected to a piston rod 40 to which is attached at the distal end thereof an arcuately shaped brake shoe 42 having a rod contacting surface 44 (FIG. 1) complementary to the periphery of the rods 14 and 16 and engageable therewith to fix the carriage 22 in a selected position along rods 14 and 16. Rotatably journaled in mounting plates 24 and 26 by means of suitable bearings 48 and 50 are a pair of vertically spaced end plates 52 and 54, thus permitting rotation of carriage 22 about a vertical axis as shown in FIG. 2.

Still referring to FIG. 2, a pair of vertical guide rods 56 and 58 are secured between end plates 52 and 54 by any suitable means, such as screws 60 for example. A pair of vertical slides 62 and 64 (only one of which is shown in FIG. 2) having sleeves 66 and 68 (FIG. 3), respectively, are mounted on guide rods 56 and 58 for vertical sliding movement thereon. A pair of counterweights 70 and 72 are attached to the slides 62 and 64, respectively, for balancing the same and facilitating vertical movement of the slides on the rods 56 and 58. A pair of cables 74 and 76, attached at their one ends to the counterweights, are trained over pulleys 78 and 80, respectively, suitably attached to end plate 52 and connected at their other ends to eye bolts 82 and 84 suitably secured to slides 62 and 64, respectively.

Figure 3:
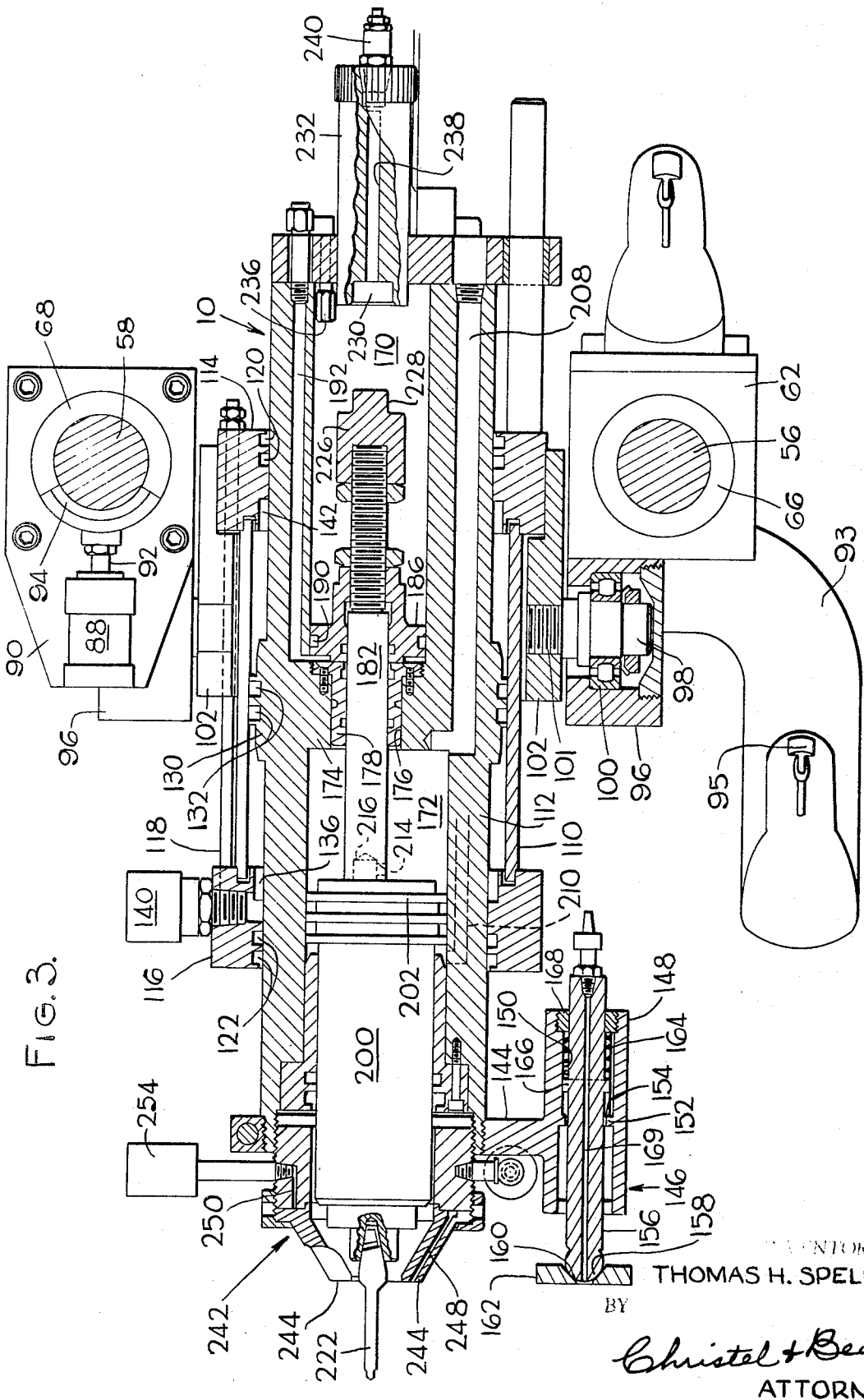
FIG. 3 is a longitudinal sectional view on the line III—III of FIG. 1.
Figure 4:
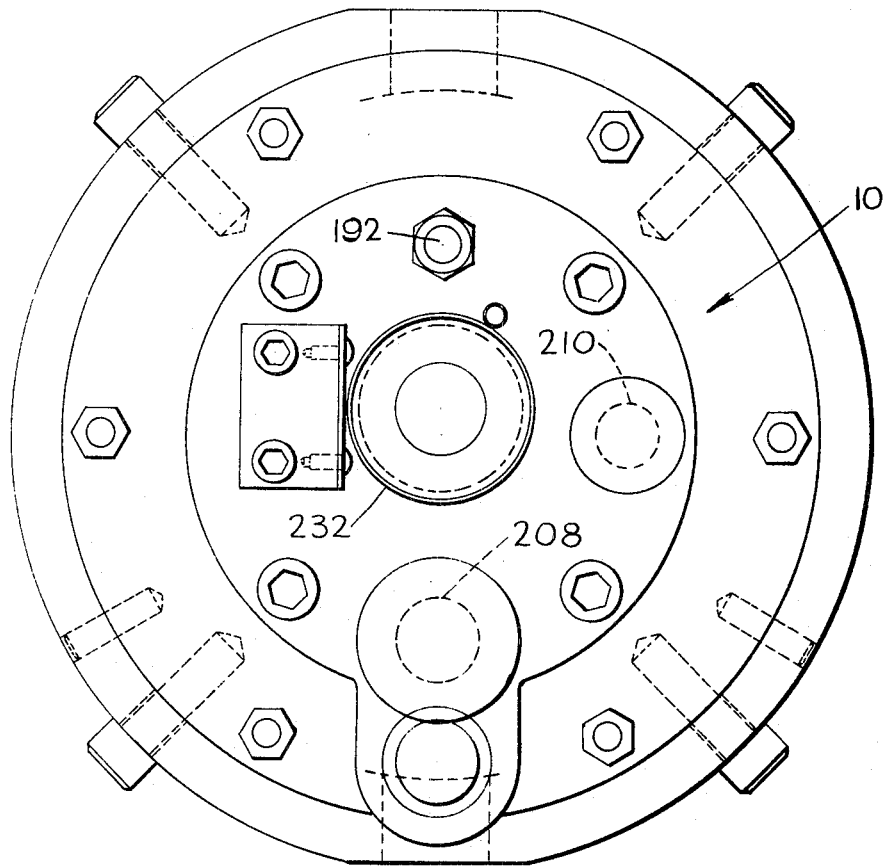
FIG. 4 is a top plan view of the apparatus.

With reference to FIG. 3, it will be seen that a brake cylinder 88 is suitably mounted on a bracket 90 supported on vertical slide 64 and is provided with a piston and a piston rod 92 having an arcuately shaped brake shoe 94 at the distal end thereof for engaging guide rod 58 to fix the drill assembly 10 in a selected vertical position along rods 56 and 58. If desired, a similar fluid actuated brake may be mounted on slide 62. Handle 93 may be provided on the slides 62 and 64, or on the drill assembly 10, for facilitating the positioning and handling of drill assembly 10. Suitable actuating means, such as buttons 95, may be mounted on the handles for actuating various control valves of the fluid pressure system.

Each vertical slide is provided with an integral bearing block 96 for supporting a pivot shaft 98 journalled for rotation in a bearing 100 mounted in block 96. As shown in FIG. 3, pivot shaft 98 engages a threaded opening 101 provided in a sleeve 102 encircling the drill assembly 10. The pivot shafts 98 of slides 62 and 64 are diametrically opposed to provide a pivot axis transverse to and intersecting the longitudinal axis of the drill assembly 10. Thus, it will be seen that drill assembly 10 is pivotable about a first transverse axis defined by the pivot shafts 98 and a second transverse axis, lying in a plane normal to the plane of the first transverse axis, by rotation of the carriage 22 in bearings 48 and 50.

Also, the drill assembly 10 may be selectively adjusted to any desired position in a vertical plane generally parallel to the work surface by a combination of horizontal carriage movement on horizontal guide rods 14 and 16 and vertical movement of slides 62 and 64 on vertical guide rods 56 and 58. Such movements enable the foot of the drill assembly 10 to be positioned at any desiretd point relative to the work surface and normal to the surface of the workpiece. It should be appreciated that the drill assembly 10 may be oriented in a substantially vertical rather than horizontal position, if desired, within the purview of the present invention.

Referring now to FIG. 3 of the drawings, it will be seen that ram drill assembly 10 comprises an outer casing or cylinder 110 and an inner casing or cylinder 112 telescopically received within outer cylinder 110 and slidable therein. Although the longitudinal axis of the drill assembly 10 is disposed in a horizontal plane with respect to its support as illustrated in FIGS. 1, 2 and 3, the use of the terms upper, lower, top, bottom, etc., as hereinafter often used in the description and function of the drill assembly, refer to the right-hand end of the structure of FIG. 3 as the upper end and the left-hand or drill end as the lower end.

Outer cylinder 110 comprises an upper end cap 114 and a lower end cap 116. A plurality of tie rods 118, arranged in a circular array about cylinder 110, extend downwardly through upper end cap 114 and sleeve 102 and are provided with threaded portions at their lower ends which engage threaded openings in lower end cap 116. Upper and lower end caps 114 and 116 are provided with annular grooves 120 and 122 for receiving suitable packing rings to provide pressure sealing between outer cylinder 110 and inner cylinder 112.

Inner cylinder 112 includes a piston 130 which engages in outer cylinder 110 and has packing rings 132. Fluid pressure is admitted to and exhausted from the underside of piston 130 (the left-hand side in FIG. 3) via an annular chamber 136 and a port 138 connected through suitable coupling means 140 to a conduit leading to a conventional control valve (not shown). Likewise, fluid pressure is admitted to and exhausted from the upper side of piston 130 via an annular chamber 142, a port and couplnig means (not shown) to a control valve. This inner cylinder 112 is thus actuated longitudinally relative to the outer cylinder 110 to bring the pressure foot of the drill assembly into engagement with the surface of the workpiece.

The lower end of inner cylinder 112 is externally threaded for receiving a collar 144 having an integral elongated template pickup assembly, generally designated 146, having a longitudinal axis parallel to the longitudinal axis of the drill assembly 10. The pickup assemby 146 comprises a housing 148 having a longitudinal bore 150 extending therethrough with an annular rib 152 projecting radially inwardly to form a shoulder 154.

A probe or locating plunger 156 is slidably mounted in housing 148 and is provided with a ball element 158 at its lower end adapted to engage and register with one of a plurality of countersunk holes 160 formed in a template bar 162. A coil spring 164 is disposed about the upper portion of probe locating plunger 156 between an annular flange 166 thereof and an end nut 168 threaded into housing 148 for urging the plunger 156 downwardly into engagement with hole 160. Downward movement of the plunger 156 is limited by engagement of annular flange 166 against shoulder 154 of housing 148. A longitudinal passageway 169 is provided in plunger 156 and may be connected to a suitable source of air pressure for dispersing dirt and debris that may accumulate in the countersunk hole 160 of template bar 162.

Inner cylinder 112 is separated into an upper chamber 170 and a lower chamber 172 by means of a partition 174 having an opening 176 extending therethrough. A bushing 178 is positioned in opening 176 and has a bore for receiving a piston rod 182. The upper end of piston rod 182 threads into a piston 186 having a packing seal in a peripheral groove 190 therein. A passageway 192 extends longitudinally through the cylinder wall and communicates between the underside of piston 186 and the bottom of compartment 170.

A combined motor housing and piston assembly 200, hereinafter referred to as a piston, is fixed to the lower end of piston rod 182 and is provided with a piston head 202. A passageway 208, connected to a suitable control valve (not shown), extends longitudinally through the wall of inner cylinder 112 for supplying and exhausting fluid pressure into and out of chamber 172 above piston 200. A passageway 210 is also connected to a suitable control valve (not shown) and extends longitudinally through the wall of inner cylinder 112 for supplying and exhausting fluid pressure into and out of chamber 172 through an annular port 212 below the piston head 202.

Fluid pressure in chamber 172 above piston head 202 acts to urge piston 200 toward the work and also supplies fluid pressure via a port 214 and passageway 216 in piston rod 182 to a fluid motor assembly within piston 200 for rotating a drill 222 releasably secured to the motor assembly by coupling means well known in the art. Since the fluid actuated motor assembly and its operation is conventional and well known in the art, no further explanation or amplification is believed necessary, it being understood that the drill 222 imparts a countersunk configuration to the hole being formed.

A retract stop 226 having a projection 228 is threaded onto the upper end of piston rod 182 and coacts with a recess 230 formed in a retract stop adjustment member 232 which threads into the top end of cylinder 112 for limiting the upward movement of pistons 186 and 200. A check valve 236 is provided at the top end of cylinder 112 for admitting atmospheric pressure into chamber 170 but preventing reverse flow therethrough. Atmospheric pressure may also be admitted into chamber 170 through a passageway 238 extending longitudinally through the stop adjustment member 232. Thus, pressure is evacuated through passageway 238 upon retraction of piston 186 and an adjustable air flow restricter 240 may be attached to the upper end of passageway 238 for dampening or cushioning the impact of projection 228 into recess 230 of member 232.

Disposed at the bottom of drill assembly 10 is a pressure foot assembly, generally designated 242, having three pressure feet 244 equidistantly spaced about the longitudinal axis of the drill tool 222. Pressure feet 224 converge downwardly and have co-planar work contacting surfaces 246 adapted to engage the surface of the workpiece to be drilled. Passageways 248 are provided in the pressure feet and communicate with a passage 250 leading to a control means 254 for a purpose hereinafter explained. Although three equally spaced pressure feet are conveniently employed for most purposes, it will be understood that any necessary or desired number may be used and that they may be arranged in any suitable pattern and formed in any desired shape.

In operation, template bar 162 is attached to the surface of a workpiece, such as a wing panel for example, at a given spacing parallel to the row of holes to be drilled in the work surface. This spacing is equal to the perpendicular distance between the axes of plunger 156 and drill 222. The retract stop adjustment member 232 is longitudinally adjusted to limit the upward movement of rod 182 a distance commensurate with the desired distance for the drill tool 222 to retract up to and/or within pressure foot assembly 242. Fluid pressure, preferably hydraulic fluid, is admitted into chamber 170 beneath piston 186.

The axis of drill assembly 10 is brought into the desired horizontal and vertical position by means of the carriage 22 and slides 62 and 64 until the ball element 158 of plunger 156 registers with a given countersunk hole 160 in template bar 162, whereupon the ball element 158 is advanced into locating engagement with such countersunk hole. Fluid pressure is admitted through the passageways 248 of the pressure feet 244 via passage 250 and control means 254.

With the drill tool retracted within the drill assembly, inner cylinder 112 is then moved longitudinally toward the work surface by admitting fluid pressure to the upper side of piston 130 through a suitable control valve to move the three pressure feet 244 as a unit into engagement with the work surface, until all three feet bear against the work surface.

In thus seating itself against the work, the drill assembly is pivoted about the pivot axis defined by the pivot shafts 98 of slides 62 and 64 and the pivot axis of bearings 48 and 50 on carriage 22 until the longitudinal axis of the drill assembly 10 and drill 222 is disposed accurately at right angles to the work surface immediately adjacent to the hole to be drilled. During this normalizing pivotal movement, ball element 158 acts as a controlling pivot with respect to the drilling apparatus but is moved upwardly against the yieldable resistance of spring 164 as the feet 244 move into mutual bearing engagement with the work surface.

After the drill apparatus is properly oriented normal to the work surface as described above with the pressure feet 244 firmly engaged with the work surface and the passageways 248 blocked, the back pressure acting in such passageways is effective to actuate pressure responsive control means 254 to supply fluid pressure through a suitable control valve into chamber 172 above the piston head 202. Since the pressure responsive control means 254 and fluid actuated control valves are well known in the art, and because they form no part of the instant invention, per se, no further explanation or illustration is believed necessary.

The fluid pressure in chamber 172 urges the piston 202 downwardly while simultaneously supplying fluid pressure to the motor assembly 220 for rotating drill 222. It should be noted that the rate of downward feed of drill 222 is controlled by the fluid pressure contained on the underside of piston 186, which fluid pressure is metered out of chamber 170 at a controlled rate.

After the countersunk hole is thus formed in the work piece, fluid pressure is admitted to chamber 172 at the underside of piston 202 and exhausted from the upper side thereof to raise the piston 202 and stop rotation of the drill 222. As hereinabove mentioned, metered flow of fluid pressure from the upper end of chamber 170 through restricter 240 dampens the impact of retract stop 226 with adjustment member 232. Inner cylinder 112 is retracted to remove the pressure foot assembly from the work surface and the entire drill assembly 10 is then moved to the next position to repeat the locating, orienting and drilling cycle.

The present invention thus provides a novel drill support means, which is simple and rigid in construction, rugged and durable in use, rapid, precise and efficient in its operation, and which permits proper orientation of the drill assembly relative to a contoured or curved work surface for drilling holes which are accurately perpendicular to the surface of the workpiece.

A preferred embodiment of this invention has been described in the foregoing specification and illustrated in the accompanying drawings. It is to be understood, however, that numerous mechanical modifications may be made without departing from the broad spirit and scope of this invention as defined in the appended claims.

What is claimed is:

1. Drilling apparatus comprising a frame, means mounted on said frame for movement in a rectilinear path, a carriage mounted on said means for pivotal movement on an axis generally normal to said rectilinear path, support means mounted on said carriage for movement in a direction generally parallel to said axis, a drill assembly mounted on said support means, and pivot means connecting between said support means and said drill assembly defining a second pivot axis generally parallel to said rectilinear path and generally normal to said carriage axis, abutment means disposed adjacent to the axis of said drill assembly at the drilling end thereof and engageable against a work surface in advance of the drill to cause said drill assembly to pivot about said two pivot axes to orient the drill assembly so that the axis thereof is perpendicular to the work surface.

2. Drilling apparatus according to claim 1 including locating means spaced laterally from the axis of said drill and having a portion engageable with a template opening on said workpiece to locate said drill axis by linear movements of said frame-mounted means and said support means.

3. Drilling apparatus according to claim 2 wherein said template-engaging portion is movable along an axis parallel to said drill assembly axis.

4. Drilling apparatus according to claim 3 including resilient means projecting said template-engaging portion toward the work surface.

5. Drilling apparatus according to claim 1 including fluid pressure means for moving the drill member of said drill assembly axially and fluid pressure means for moving said abutment means axially, whereby said drill member may be advanced axially to effect drilling of a workpiece after the drill axis has been correctly oriented by operation of said abutment means.

6. Drilling apparatus according to claim 1 wherein said abutment means engages said work surface at at least two points spaced angularly relative to said drill axis.

7. Drilling apparatus according to claim 5 wherein said abutment means engages said work surface at at least two points spaced angularly relative to said drill axis.

8. Drilling apparatus according to claim 7 including pressure means responsive to full engagement of said abutment means against said work surface for activating said fluid pressure drill member moving means to effect a drilling operation.

9. Drilling apparatus according to claim 4 wherein said abutment means engages said work surface at at least two points spaced angularly relative to said drill axis whereby said resiliently projected template-engaging portion maintains correct lateral spacing of the drill axis relative to the template opening during drill axis orientation by said abutment means.

10. Drilling apparatus comprising a drill assembly and mounting means therefor, said mounting means including a pair of free pivotal mountings extending transversely relative to each other and at right angles to the axis of said drill assembly, said mounting means also including means mounting said drill assembly for free linear adjustment in two directions substantially at right angles to each other and at right angles to said drill assembly axis, abutment means disposed adjacent to the axis of said drill assembly at the drilling end thereof and engageable against a work surface in advance of the drill to cause said drill assembly to pivot about said two pivot axes to orient the drill assembly so that the axis thereof is perpendicular to the work surface.

11. Drilling apparatus according to claim 10 wherein one of said linear adjustments is generally horizontal and the other generally vertical, means counterbalancing said drill assembly with respect to vertical movements thereof, said drill assembly axis lying generally in a horizontal direction.

12. Drilling apparatus according to claim 10 including locating means spaced laterally from the axis of said drill and having a portion engageable with a template opening on said workpiece to locate said drill axis by linear movements of said frame-mounted means and said support means.

13. Drilling apparatus according to claim 10 wherein said template-engaging portion is movable along an axis parallel to said drill assembly axis.

14. Drilling apparatus according to claim 10 including resilient means projecting said template-engaging portion toward the work surface.

15. Drilling apparatus according to claim 10 including fluid pressure means for moving the drill member of said drill assembly axially and fluid pressure means for moving said abutment means axially, whereby said drill member may be advanced axially to effect drilling of a workpiece after the drill axis has been correctly oriented by operation of said abutment means.

16. Drilling apparatus according to claim 10 wherein said abutment means engages said work surface at at least two points spaced angularly relative to said drill axis.

17. Drilling apparatus according to claim 15 wherein said abutment means engages said work surface at at least two points spaced angularly relative to said drill axis.

18. Drilling apparatus according to claim 17 including pressure means responsive to full engagement of said abutment means against said work surface for activating said fluid pressure drill member moving means to effect a drilling operation.

19. Drilling apparatus according to claim 14 wherein said abutment means engages said work surface at at least two points spaced angularly relative to said drill axis whereby said resiliently projected template-engaging portion maintains correct lateral spacing of the drill axis relative to the template opening during drill axis orientation by said abutment means.

References Cited

UNITED STATES PATENTS

| | | | |
|---|---|---|---|
| 3,285,102 | 11/1966 | De Voss | 77—13 |
| 2,963,927 | 12/1960 | Hanger | 77—13 |
| 2,868,043 | 1/1959 | Robbins | 77—7 |

FRANCIS S. HUSAR, Primary Examiner

U.S. Cl. X.R.

77—31